United States Patent [19]

Smith

[11] 4,010,928
[45] Mar. 8, 1977

[54] PISTON-OPERATED PARALLEL-SLIDE GATE VALVE

[75] Inventor: Russell G. Smith, Cincinnati, Ohio

[73] Assignee: Xomox Corporation, Cincinnati, Ohio

[22] Filed: Dec. 27, 1974

[21] Appl. No.: 536,868

[52] U.S. Cl. .............................. 251/31; 251/327; 251/63; 251/366
[51] Int. Cl.² ...................... F16K 31/122
[58] Field of Search ............ 251/31, 63, 176, 327, 251/366

[56] References Cited
UNITED STATES PATENTS

| | | | |
|---|---|---|---|
| 2,616,449 | 11/1952 | Maha | 251/31 X |
| 2,976,701 | 3/1961 | Greenawalt | 137/625.29 X |
| 3,635,436 | 1/1972 | Tillman | 251/31 |

FOREIGN PATENTS OR APPLICATIONS

| | | | |
|---|---|---|---|
| 763,387 | 2/1934 | France | 251/176 |
| 1,179,747 | 5/1959 | France | 251/30 |
| 407,138 | 3/1934 | United Kingdom | 251/176 |
| 649,187 | 1/1951 | United Kingdom | 251/176 |

*Primary Examiner*—Arnold Rosenthal
*Attorney, Agent, or Firm*—J. Warren Kinney, Jr.

[57] ABSTRACT

A gate valve having good seismic profile has a gate which is rapidly and efficiently shifted between fully opened and fully closed positions by pistons housed within cylinders formed integral with the valve body. The gate comprises two half-gates or discs having means interposed therebetween for disposing said half-gates in positive, sealing relationship with the seating surfaces of the valving port of the valve body when the gate is in a fully closed position. Movement of the gate is effected by the pressure media being controlled by the valve in such a manner as to eliminate leakage.

7 Claims, 6 Drawing Figures

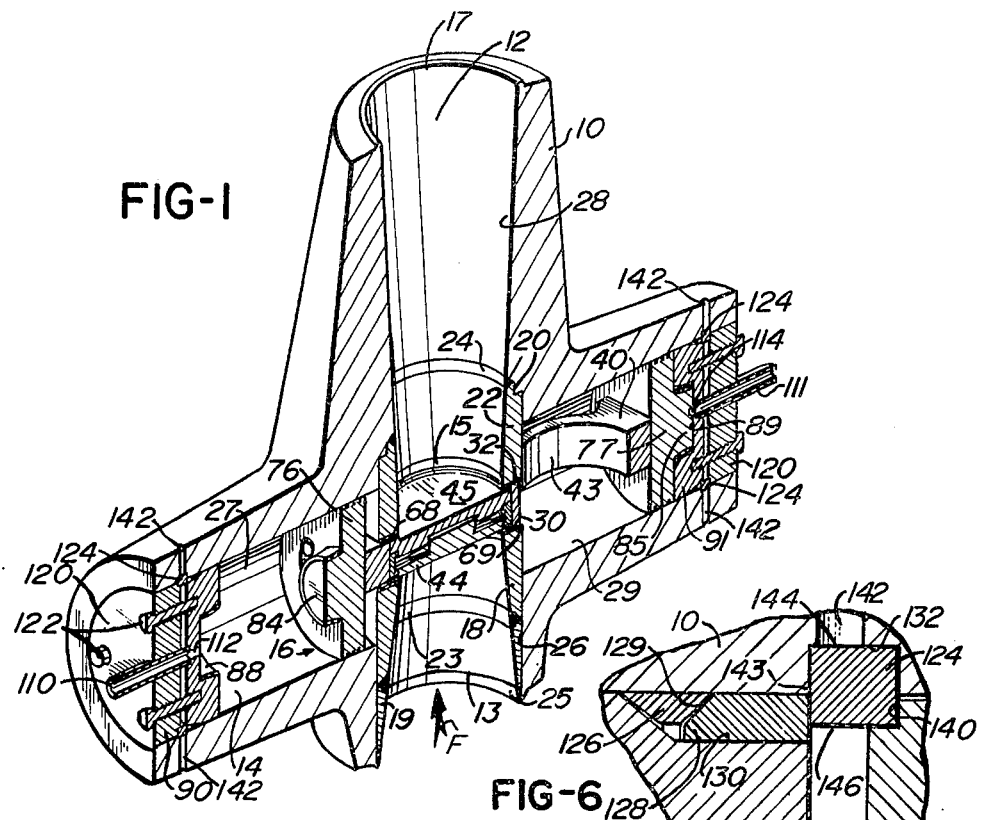
FIG-1
FIG-6
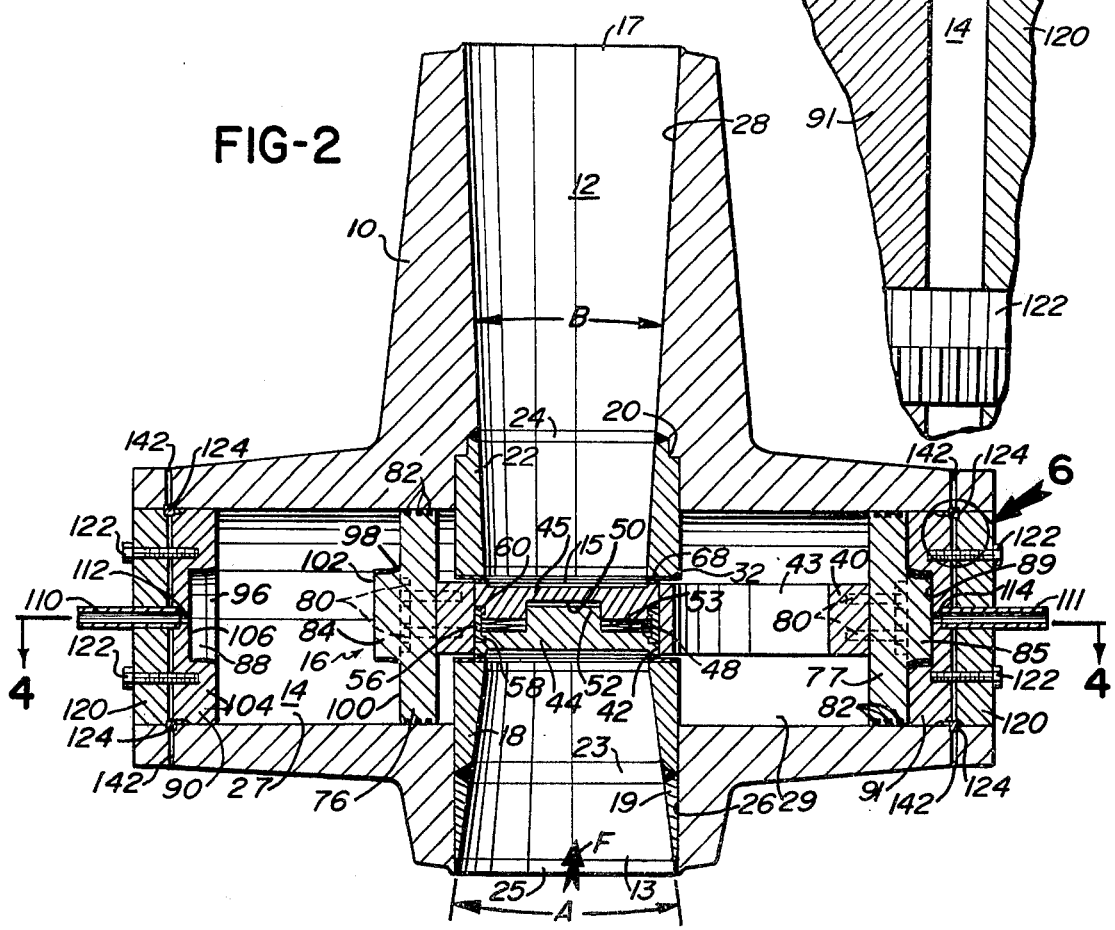
FIG-2

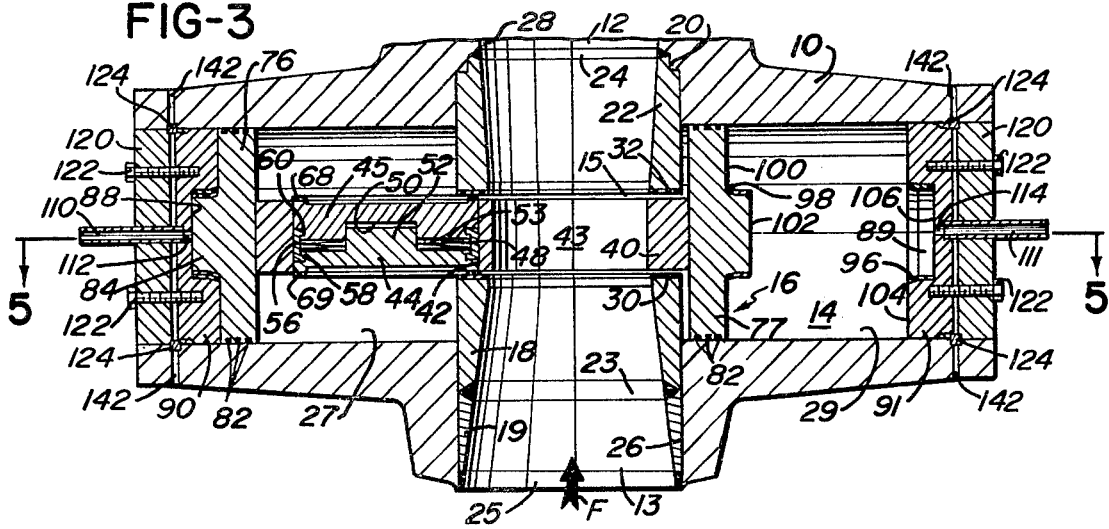
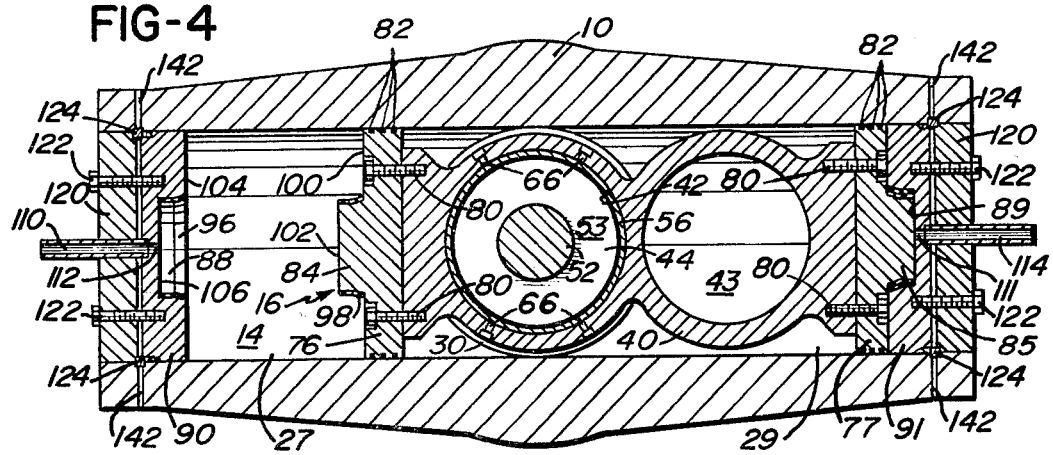
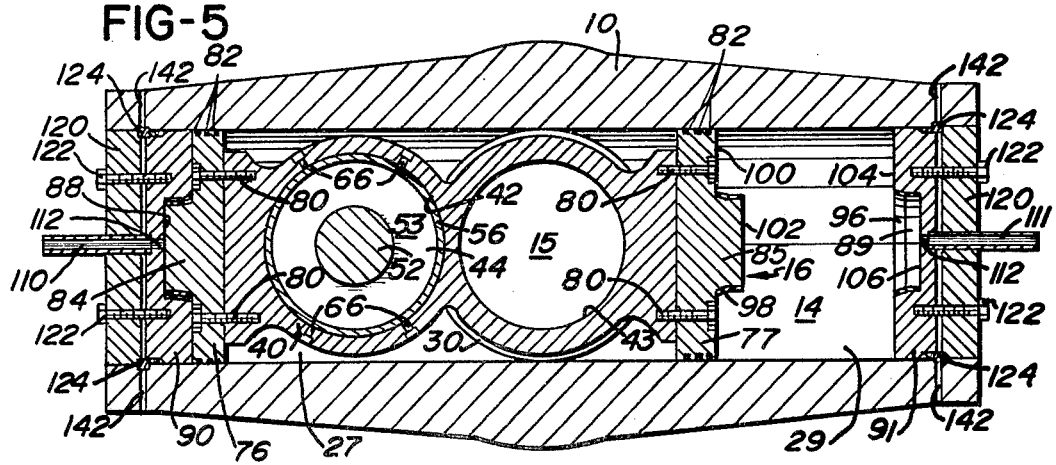

PISTON-OPERATED PARALLEL-SLIDE GATE VALVE

BACKGROUND OF THE INVENTION

1. Field of the Invention

The present invention is directd to a gate valve having an integral body with axially aligned inlet, valving and outlet ports wherein a gate is slidable between open and closed positions relative to the valving port for controlling the flow of media therethrough. A pair of axially aligned cylinders are formed integral with the body and are normal to and in open communication with the valving port for carrying the gate, wherein a piston in each of said cylinders is secured to an opposite end of the gate for shifting the gate between open and closed positions in response to pressure media selectively introduced into one or the other of the cylinders.

2. Description of the Prior Art

Gate valves of the prior art generally include valve bodies having coaxial inlet, valving and outlet ports and an elongate neck which projects outwardly from the valving port. The valving member or gate is in the general shape of a wedge which is adapted to be shifted between positions of interfering and noninterfering relationship with the media passageway of the valve to open and close the valve to media flow. The gate is secured to and carried by an elongate, threaded actuator stem coaxial with the neck and received by a threaded, stem-receptive aperture in the neck of the valve. A stem-receptive nut is rotatably mounted external to the valve body seal, and rotation imparted to said external stem nut imparts endwise axial movement to the stem to shift the gate between open and closed positions. The stem may be manually turned by means such as a hand-wheel or the like mounted thereon, or on larger valves it may be controlled by externally applied forces generated by electric motors or the like.

Examples of the gate valves of the prior art are disclosed in my earlier U.S. Pat. Nos. 2,810,494 and 2,617,554.

SUMMARY OF THE INVENTION

The present invention differs from gate valves of the prior art in that the gate and actuator comprise a piston-operated, parallel-slide gate which may be shifted between open and closed positions by the media to be controlled by the valve.

The unitary valve body comprises axially aligned inlet, valving and outlet ports and a pair of integral, axially aligned cylinders normal to, on opposite sides of and in open communication with the valving port. The gate or valving member is inserted in the valving port and has opposite ends which terminate in each of said cylinders. A piston disposed in each cylinder is secured to and carried by an opposite end of the gate, wherein pressure media including, but not limited to, the media to be controlled by the valve is selectively introduced into one or the other of the cylinders for shifting the gate between its opened and closed positions.

The inlet and valving ports, and the valving and outlet ports define the entrance and egress angles, respectively, of a true venturi throat, permitting a substantial reduction of the diameter of the valving port and gate opening without appreciably adversely effecting the pressure and flow capacity of the valve. The weight of the valve varies in proportion to the media flow opening thereof, and this reduction of the valving port opening results in substantial reduction in the weight of the valve.

The gate comprises an elongate gate carrier having a pair of parallel, cylindrical openings therethrough, each of which has an axis parallel to the axis of the valving port. A pair of nested, interlocking half-gates are inserted in one of said openings and are adapted to engage and establish a sealing relationship with the valving port when the gate is in the closed position, thereby closing the valve to media flow. When the gate is shifted to the opened position, the other of said openings is disposed in axial alignment with said valving port, thereby permitting the unrestricted flow of media through the valve.

Pressure or cylinder heads associated with each cylinder are adapted to receive and form a positive stop for each of said pistons for accurately aligning the gate with the valving port when the gate is shifted between open and closed positions. Each piston terminates in an outwardly projecting, centrally disposed, plug-defining head having an outwardly extending, tapered surface, whereas each pressure head includes a socket-defining, centrally disposed recess having a tapered contour which is the exact counterpart of the tapered surface on the piston heads, the mating surfaces providing a positive pressure media seal when disposed in abutting engagement with one another. The plug and socket configuration generates a slight pressure increase at the end of each piston stroke, providing a cushioning effect on the gate and actuator when shifted between positions.

The compact design of the valve greatly enhances the seismic profile thereof over valves having elongate necks and actuator stems. Further, the positive pressure seal provided by the piston and cylinder, wherein the entire actuator is contained in a sealed enclosure within the valve body, eliminates any external leakage from the area surrounding the actuator, making the valve acceptable for use in controlling media which may be of a radioactive nature, such as, by way of example, the feed water and/or main line steam of a nuclear powered generating plant. The piston-operated gate may be rapidly shifted between positions, further enhancing the use thereof with media of a hazardous nature.

The media which is to be controlled by the valve may be utilized as the pressure media for shifting and maintaining the gate in position, thereby eliminating external power sources for operating the valve and precluding cross-contamination of the controlled media with the pressure media.

It is, therefore, a primary object of the present invention to provide a piston-operated, parallel-slide gate valve of good seismic profile wherein the gate is shiftable between opened and closed positions relative to the valving port in response to pressure media selectively introduced into axially aligned cylinders which are normal to and in communication with the valving port to effectively control the flow of media therethrough.

It is, further, an object of the invention to provide a valve of reduced size and weight, wherein the valving port may be of reduced diameter without adversely effecting the capacity of the valve.

Other advantages and features of the present invention will be readily apparent from the accompanying drawings and description of the preferred embodiment.

BRIEF DESCRIPTION OF THE DRAWINGS

FIG. 1 is a perspective view of a gate valve shown in vertical cross-section, incorporating the features of the present invention.

FIG. 2 is a sectional view of the gate valve of FIG. 1, illustrating the gate in closed position.

FIG. 3 is a fragmentary view similar to FIG. 2, illustrating the gate in open position.

FIG. 4 is a sectional view taken at line 4—4 of FIG. 2.

FIG. 5 is a sectional view taken at line 5—5 of FIG. 3.

FIG. 6 is a fragmentary view of the encircled area indicated by the arrow 6 of FIG. 2, greatly enlarged for clarity of detail and understanding.

DESCRIPTION OF THE PREFERRED EMBODIMENTS

The subject valve comprises a unitary body 10 having a pair of orthogonally disposed, intersecting passageways 12 and 14 therethrough. Axially aligned inlet, valving and outlet ports 13, 15 and 17, respectively, are disposed within passageway 12, whereas axially aligned cylinders 27 and 29 are disposed within passageway 14. In the present embodiment the valving port 15 is defined by a pair of axially aligned, parallel flat seating surfaces 30 and 32.

The diameter of the valving port comprises the restricted throat portion of a true venturi having an entrance angle A and an egress angle B, note FIG. 2. In the preferred embodiment of the invention, the entrance and egress angles are defined by elements or liners 18, 19 and 22, respectively, of forged material suitably anchored within cylindrical portion 26 of passageway 12, on opposite sides of the valving port, such as by means of welds 23, 24 and 25 (FIGS. 1, 2 and 3). The tapered portion 28 of passageway 12 extends from shoulder 20 to exit port 18 and is of an angle corresponding to egress angle B, wherein weld 24 provides a smooth, continuous transition surface between lines 18 and the bore. Welds 23 and 25 provide similar transition surfaces between liners 18 and 19.

The adjacent end faces of members 18 and 22 define a pair of spaced, parallel, flat seating surfaces 30 and 32, each of which are hardened to provide long lasting, trouble-free, wear resistant surface areas. Valving member or gate 16 is mounted for sliding movement between the fully closed position of FIG. 2, to the fully opened position of FIG. 3 by means of a gate carrier 40, which, as illustrated in FIGS. 1, 2 and 3, is centrally disposed within passageway 14, having a thickness which closely approaches, but is less than the distance between the seating surfaces 30 and 32 of the valving port.

With reference now to FIGS. 4 and 5, it will be noted that carrier 40 is provided with a pair of through openings or ports 42 and 43, wherein the diameter of opening 43 defines the throat of the venturi when the valving member or gate has been disposed in the fully opened position of FIGS. 3 and 5. Opening 42 is adapted to securely though releasably receive a pair of nested, interlocking half-gates 44 and 45, each of which are provided with an outer, continuous, raised, peripheral face or seating surface 69,68, respectively, which surfaces are adapted to engage seating surfaces 30 and 32 of the valving port, when the gate is in the fully closed position of FIGS. 2 and 4. The faces or seating surfaces 69 and 68 of half-gates 44 and 45 are hardened similar to surfaces 30 and 32 to provide long lasting, trouble-free, wear resistant surfaces.

The free outer ends of carrier 40 are securely, though releasably, secured to the inner face of pistons 76 and 77, such as by means of bolts 80. The pistons, each of which are provided with groups of sealing rings 82, are adapted to be reciprocated within their respective cylinders 27 and 29. The outer surface of each of said pistons terminates in an outwardly projecting, centrally disposed, circular piston head or boss 84,85, wherein the outer periphery of each boss is provided with an outwardly extending tapered surface 98.

The numerals 90 and 91 denote the end plate or pressure head of cylinders 27 and 29, respectively, the inner surface 104 of each of which is provided with a centrally disposed recess 89,89 having a tapered contour 96 which is the exact counterpart of taper 98 of the complementary boss 84,85, providing a relationship which establishes a positive pressure media seal between the mating surfaces 98 and 96 whereby to positively preclude the escape of pressure media from the cylinders through fluid media ports 112 and/or 114, the inner ends of which terminate and are in open communication with the bottom surface 106 of the recesses.

In the preferred embodiment of the invention, the aforesaid mating surfaces of bosses 84,85 and recesses 88,89 are suitably hardened to provide long lasting, trouble-free, wear resistant surfaces.

The position of pistons 76 and 77 is controlled by pressure media selectively introduced into cylinders 27 and/or 29 through inlet-outlet ports 112 and 114 via supply conduits 110,111. When pressure media is introduced into cylinder 27 piston 76 is advanced toward passageway 12 as piston 77 enters seat 89 and positively engages cylinder head 91 (FIGS. 1, 2 and 4). As piston 77 enters seat 89 and surfaces 96 and 98 approach one another, there is a slight pressure increase of any fluid in seat 89, thereby cushioning the end of the stroke of the piston as it engages cylinder head 91. It should, of course, be understood when pressure media is introduced into cylinder 29 via port 114, piston 77 is advanced toward the valving port as piston 76 is inserted in seat 88 and positively engages head 90. Pressure media in cylinder 27 may, of course, be evacuated prior to or simultaneously with the introduction of pressure media into cylinder 29 without adversely effecting the operation of the valve.

An important feature of the valve of the present invention resides in the fact that gate 16 may be very rapidly shifted between open and closed positions, utilizing the upstream pressure of the media being controlled by the valve whereby the gate may be closed in but a fraction of the time heretofore required to close conventional gate valves.

It should be understood that upstream pressure media may be selectively introduced to cylinders 27, 29, via conduits 110, 111, and that said cylinders may be exhausted into the atmosphere, or into a lower pressure system, such as condensate, such as, by way of example, a pair of three-way valves not illustrated. A Tee fitting, or the like on each of conduits 110, 111 will permit one three-way valve to control the selective introduction of pressure media into one or the other of cylinders 27, 29 for opening or closing the gate while permitting a second three-way valve to control the exhaust from that cylinder into which pressure media is not being introduced.

With reference now to the nested, interlocking, half-gates 44 and 45, it will be noted that the seating or sealing surfaces 69, 68 thereof are maintained in spaced, parallel relationship with one another by compression means such as belleville washer 48 or the like. The half-gates are complementary, mated members wherein half-gate 45 includes an inner portion in the form of socket defining recess 50 and wherein half gate 44 includes a complementary inner portion in the form of plug defining projecting member 52. The adjacent peripheral surface 53 of each half-gate defines a seat for belleville washer 48.

Gate-retainer ring 56 circumscribes each of said half-gates and includes a pair of inwardly projecting rims 58 and 60 which are received by complementary chennels in the half-gates. Means such as, by way of example, bolts 66 which are spaced about the circumference of the opening 42 maintain ring 56, half-gate 44 and half-gate 45 in proper seated relationship to carrier 40 (FIGS. 4 and 5).

In passing, it should be noted that with the gate in closed position, as in FIGS. 1, 2, and 4, the upstream pressure is effectively trapped within the inlet port and the inlet side of the valving port, and this pressure will have a tendency to spread the half-gates for further enchancing the sealing characteristics of the valve.

Referring now to FIG. 6, it will be noted that each of pressure heads 90–91 are maintained in fixed relationship with valve body 10 by means of cover member 120, bolts 122 and a plurality of segmented retaining rings 124. A sealing relationship between valve body 10 and each pressure head is provided by means of a "delta" seal 126 of soft iron or the like which is maintained in compressed relationship relative to body 10 and pressure heads 90–91 by thrust ring 128. Delta seal 126 is inserted in the circumferential seat defined by the space between reduced portion 130 of each pressure head and the body 10, after which thrust ring 128 is disposed in abutting relationship with the delta seal at 129. Generally, the delta seal and thrust ring are continuous, annular members which completely circumscribe the pressure head.

A plurality of segmented retaining rings 124 are inserted in annularly spaced relationship in the ring receptive seat or channel 132 of body member 10, after which cover member 120 is placed in covering relationship therewith with each segmented ring received in annular channel 140 thereof. Bolts 122 draw the pressure head and cover toward one another to establish an abutting relationship between rings 124 and the pressure head wherein face 143 of each ring 124 abuttingly engages thrust ring 128 and thereby generates a compression force on delta seal 126 for effecting a media tight sealing relationship between seal 126, body 10 and the pressure head 91.

A plurality of drilled holes 142 are circumferentially spaced about the valve body 10, one each in communication with each of the segmented rings 124 for aiding in the disassembly of the valve where such is desired. Use of the delta ring, thrust ring and the segmented retaining rings and the method for removing same is fully disclosed in my aforementioned U.S. Pat. No. 2,810,494.

What is claimed is:

1. A gate valve comprising a one-piece valve body having axially aligned inlet, valving and outlet ports, and a pair of axially aligned cylinders normal to a common axis passing through each of said ports, wherein said cylinders are disposed on opposite sides of said valving port; a gate slidably mounted for movement between open and closed positions relative to said valving port; gate actuating pistons in each of said cylinders; means in open communication with each of said cylinders through which pressure media is selectively introduced and/or exhausted incident to movement of the gate to one or the other of its positions; a gate carrier having opposite side edges and a pair of through openings intermediate said edges wherein the said gate is securely though releaseably mounted in one of said openings and wherein the other opening defines a through-port corresponding to the cross-sectional area of the valving port; means securing the opposite side edges of said carrier relative to and between said pistons whereby said carrier is supported and mounted for sliding movement in a plane normal to the said common axis through the inlet, valving and outlet ports; each said piston having an inner face adjacent the valving port and an outer face remote therefrom, and wherein each cylinder has an inner end in open communication with the valving port and an outer end remote therefrom and defined by a cylinder head; the outer face of each piston and the inner face of each cylinder head having complementary plug and socket portions which are disposed in nested, interengaging relationship as a piston reaches the outer end of its exhaust stroke, a dual inlet-outlet port for pressure media in the said complementary means of each of said cylinder heads; the nested, interengaging relationship of said plug and socket means positively closing off the exhaust of pressure media through the dual inlet-outlet port of the cylinder head of the cylinder, cushioning the end of the stroke of the piston as the plug and socket engage; and said complementary plug and socket portions being hardened to provide wear-resistant surfaces.

2. A gate valve as called for in claim 1, wherein the valving port comprises a pair of parallel, smooth, laterally spaced seating surfaces, one adjacent the inlet port, the other adjacent the outlet port, and each of which completely circumscribe and define inlet and outlet seating surfaces which are engaged by corresponding seating surfaces of the gate; and wherein the gate includes a pair of parallel, smooth, laterally spaced seating surfaces which completely circumscribe and define inlet and outlet seating surfaces which engage corresponding seating surfaces of the valving port, when the gate is in a closed position relative thereto.

3. A gate valve as called for in claim 2, wherein the seating surfaces of the valving port and gate are hardened to enhance their wear-resistant characteristics.

4. A gate valve as called for in Claim 2, wherein the gate comprises a pair of nested, interlocking half gates each of which includes an outer, seating surface and an inner, interlocking surface wherein said interlocking surfaces preclude relative lateral or transverse movement while permitting relative axial movement of the half gates; and means interposed between said interlocking surfaces for continuously and yieldingly urging the outer seating surfaces of the composite gate into a fluid and pressure-tight seal with the inlet and outlet seating surfaces of the valving port.

5. A gate valve as called for in claim 1, wherein the inlet and outlet ports of the valve body are smooth and taper inwardly toward and with respect to the cross-sectional area of the valve port whereby to establish a true venturi flow configuration to pressure media passing through said valve when the gate thereof is open to minimize pressure loss through the valve without any significant reduction in the flow capacity thereof.

6. A gate valve as called for in claim 1, wherein said cylinder heads are securely though releasably received within and secured, one each, relative to the interior of one of said cylinders, the entire valve gate and piston assembly being contained in a sealed enclosure defined by said valve body and cylinder heads, whereby external leakage from the area surrounding the actuator is eliminated.

7. A gate valve as called for in claim 1, wherein the one-piece valve body and cylinder heads closing the cylinders therein, with the valve gate and pistons confined therewithin, defines a structural relationship between the cylinders and the valving port such that any leakage of the pressure media being controlled by the valve is completely retained within the confines of the valve body, during those periods of time when the valve is open, closed, and/or while the gate is being moved from one to the other of its opened and closed positions.

* * * * *